United States Patent
Forlines et al.

(10) Patent No.: US 10,592,049 B2
(45) Date of Patent: Mar. 17, 2020

(54) SYSTEMS AND METHODS FOR USING HOVER INFORMATION TO PREDICT TOUCH LOCATIONS AND REDUCE OR ELIMINATE TOUCHDOWN LATENCY

(71) Applicant: Tactual Labs Co., New York, NY (US)

(72) Inventors: Clifton Forlines, South Portland, ME (US); Ricardo Jorge Jota Costa, Toronto (CA); Daniel Wigdor, Toronto (CA); Karan Singh, Toronto (CA); Haijun Xia, Toronto (CA)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/008,236

(22) Filed: Jun. 14, 2018

(65) Prior Publication Data

US 2018/0292945 A1    Oct. 11, 2018

Related U.S. Application Data

(63) Continuation of application No. 14/859,185, filed on Sep. 18, 2015, now Pat. No. 10,088,952.

(60) Provisional application No. 62/052,323, filed on Sep. 18, 2014.

(51) Int. Cl.
| | |
|---|---|
| *G06F 3/041* | (2006.01) |
| *G06F 3/0488* | (2013.01) |
| *G06N 5/04* | (2006.01) |
| *G06N 7/00* | (2006.01) |

(52) U.S. Cl.
CPC .......... *G06F 3/0418* (2013.01); *G06F 3/0416* (2013.01); *G06F 3/04883* (2013.01); *G06N 5/04* (2013.01); *G06N 7/00* (2013.01); *G06F 2203/04101* (2013.01)

(58) Field of Classification Search
CPC ......... G06F 3/0416; G06F 2203/04101; G06F 3/0418; G06F 3/04883; G06N 7/00; G06N 5/04
See application file for complete search history.

(56) References Cited

U.S. PATENT DOCUMENTS

| | | |
|---|---|---|
| 2011/0175832 A1 | 7/2011 | Miyazawa et al. |
| 2012/0169646 A1 | 7/2012 | Berkes et al. |
| 2013/0181908 A1 | 7/2013 | Santiago et al. |
| 2013/0222329 A1 | 8/2013 | Larsby et al. |
| 2014/0143692 A1 | 5/2014 | Wigdor et al. |

(Continued)

*Primary Examiner* — Charles V Hicks
(74) *Attorney, Agent, or Firm* — Adam Landa

(57) ABSTRACT

A system and method are disclosed for using a touch sensing system capable of sensing location of a finger or object above a touch surface to inform a touch response system in an electronic device of a predicted future user input event or motion data in advance of an actual touch event. Current user input is sensed via the touch sensing system and data reflecting hover information is created. A model of user interaction with a touch surface is applied to the data representative of the user input to create data reflecting a prediction of a future user input event. In an embodiment, prior to occurrence of the predicted user input event, a predicted location and a predicted time at which the predicted future user input event will occur are provided to a touch response system.

26 Claims, 5 Drawing Sheets

(56) References Cited

U.S. PATENT DOCUMENTS

2014/0198062 A1 7/2014 Kreutzer et al.
2014/0240242 A1* 8/2014 Kawalkar ............. G06F 3/0418
　　　　　　　　　　　　　　　　　　　　345/173

* cited by examiner

FIGURE 3: SIDE VIEW OVERLAY OF ALL TRIALS, NORMALIZED TO START AND END POSITIONS.

US 10,592,049 B2

SYSTEMS AND METHODS FOR USING HOVER INFORMATION TO PREDICT TOUCH LOCATIONS AND REDUCE OR ELIMINATE TOUCHDOWN LATENCY

This application is a continuation of U.S. patent application Ser. No. 14/859,185 filed Sep. 18, 2015 entitled "Systems and Methods for Using Hover Information to Predict Touch Locations and Reduce or Eliminate Touchdown Latency," which claims priority to U.S. Provisional Patent Application No. 62/052,323 filed Sep. 18, 2014 entitled "Systems And Methods For Using Hover Information To Predict Touch Locations And Reduce Or Eliminate Touchdown Latency," the entire disclosure of each of which is incorporated herein by reference. This application relates to the subject matter of U.S. patent application Ser. No. 14/490,363 filed Sep. 18, 2014, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever. This application relates to fast multi-touch sensors such as those disclosed in U.S. patent application Ser. No. 14/490,363 filed Sep. 18, 2014 entitled "Systems And Methods For Providing Response To User Input Using Information About State Changes And Predicting Future User Input," U.S. patent application Ser. No. 13/841,436 filed Mar. 15, 2013 entitled "Low-Latency Touch Sensitive Device," U.S. Patent Application No. 61/798,948 filed Mar. 15, 2013 entitled "Fast Multi-Touch Stylus," U.S. Patent Application No. 61/799,035 filed Mar. 15, 2013 entitled "Fast Multi-Touch Sensor With User-Identification Techniques," U.S. Patent Application No. 61/798,828 filed Mar. 15, 2013 entitled "Fast Multi-Touch Noise Reduction," U.S. Patent Application No. 61/798,708 filed Mar. 15, 2013 entitled "Active Optical Stylus," U.S. Patent Application No. 61/710,256 filed Oct. 5, 2012 entitled "Hybrid Systems And Methods For Low-Latency User Input Processing And Feedback" and U.S. Patent Application No. 61/845,892 filed Jul. 12, 2013 entitled "Fast Multi-Touch Post Processing." The entire disclosures of those applications are incorporated herein by reference.

FIELD

The present invention relates in general to the field of user input, and in particular to systems and methods that include a facility for predicting user input.

DETAILED DESCRIPTION

Figure 1:
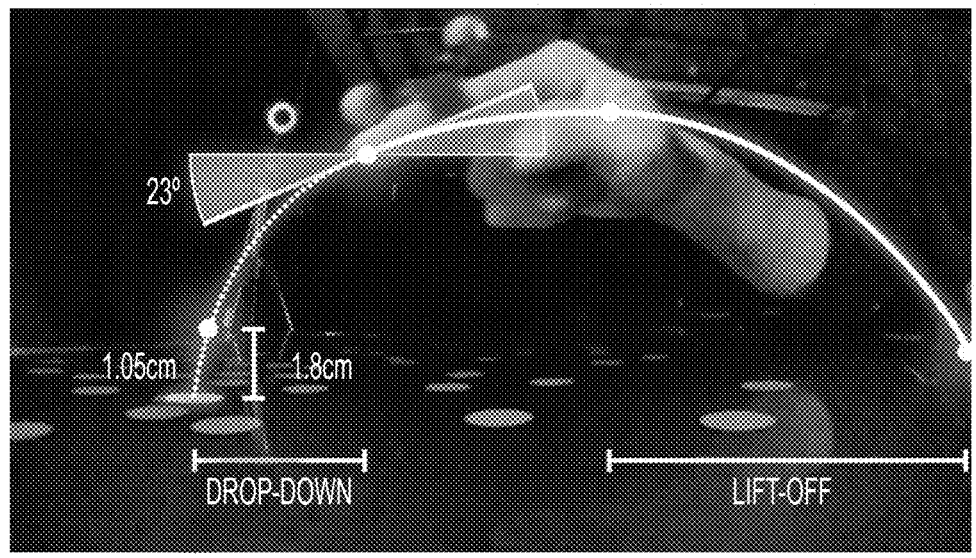
FIG. 1 shows a side view illustrating phases of a touch motion above a touch surface.

In an embodiment, a method is provided for reducing the perceived latency of touch input by employing a model to predict touch events before the finger reaches the touch surface is proposed. A corpus of 3D finger movement data was collected, and used to develop a model capable of three granularities at different phases of movement: initial direction, final touch location, time of touchdown. As shown in FIG. 1, the model predicts the location and time of a touch. Parameters of the model are tuned to the latency of the device to maximize accuracy while guaranteeing performance. The model has been validated for target distances $>=25.5$ cm, and demonstrated to have a mean accuracy of 1.05 cm 128 ms before the user touches the screen. A user study of different levels of latency reveals a strong preference for unperceivable latency touchdown feedback. A form of 'soft' feedback is disclosed, as well as other performance-enhancing uses for this prediction model.

The time delay between user input and corresponding graphical feedback, here classified as interaction latency, has long been studied in computer science. Early latency research indicated that the visual "response to input should be immediate and perceived as part of the mechanical action induced by the operator. Time delay: No more than 0.1 second (100 ms)". More recent work has found that this threshold is, in fact, too high, as humans are able to perceive even lower levels of latency—for direct touch systems, it has been measured as low as 24 ms when tapping the screen, and 6 ms when dragging. Furthermore, input latencies well below 100 ms have been shown to impair a user's ability to perform basic tasks.

While the touchdown latency of current commercial touch devices can be as low as 75 ms, this latency is still perceptible to users. Eliminating latency, or at least reducing it beyond the limits of human perception and performance impairment, is highly desirable. Both Leigh et al. and Ng et al. have demonstrated direct-touch systems capable of less than 1 ms of latency. While compelling, these are not commercially viable for most applications: an FPGA replaced a general-purpose processor and software, they employ a high-speed projector rather than a display panel, and each is capable of displaying only simple geometry.

A system is disclosed herein for reducing or eliminating the apparent latency of an interactive system. We define apparent latency as the time between an input and the system's soft feedback to that input, which serves only to show a quick response to the user (e.g.: pointer movement, UI buttons being depressed), as distinct from the time required to show the hard feedback of an application actually responding to that same input.

Methods are disclosed herein for eliminating the apparent latency of tapping actions on a large touchscreen through the development and use of a model of finger movement. In an embodiment, the model is used to track the path of a user's finger as it approaches the display and predict the location and time of its landing. The method then signals the application of the impending touch so that it can pre-buffer its response to the touchdown event. In an embodiment, a visual response to the touch is triggered at the predicted point before the finger lands on the screen. The timing of the trigger is tuned to the system's processing and display latency, so the feedback is shown to the user at the moment they touch the display. The result is an improvement in the apparent latency as touch and feedback occur simultaneously.

In order to predict the user's landing point, we must first understand the 3D spatial dynamics of how users perform touch actions. To this end, we augmented a Samsung SUR40 tabletop with a high fidelity 3D tracking system to record the paths of user finger movements through space as they performed basic touchscreen tasks. We collected data on input paths by asking 15 participants to perform repeated tapping tasks. We then analyzed this data using various numerical and qualitative observations to develop a prediction model of 3D finger motion for touch-table device interaction. This model, which was validated by a subsequent study for targets at least 25.5 cm distant, enables us to predict the movement direction, touch location, and touch time prior to finger-device contact. Using our model, we can achieve a touch-point prediction accuracy of 1.05 cm on average 128 ms before the user touches the display. This accuracy and prediction time horizon is sufficient to reduce the time between the finger touch down and the system's apparent response to beneath the 24 ms lower bound of human perception.

Below we first describe relevant related work in the areas of hover sensing, input latency, and touch prediction. We then describe a pair of studies that we used to formulate and then validate our predictive model. Next, we describe a third study in which participants' preferences for low-latency touch input were investigated. Finally, we describe a number of uses for our model beyond simple feedback and outline future work that continues the exploration of touch prediction.

Related Work

We draw from several areas of related work in our present research: the detection and use of hovering information in HCl, the psychophysics of latency, the use of predictive models in HCl, and the modeling of human motion in three dimensions.

Hover Sensing

A number of sensing techniques have been employed to detect the position of the user prior to touching a display. In HCl research, hover sensing is often simulated using optical tracking tools such as the Vicon motion capture system, as we have done in this work. The user is required to wear or hold objects augmented with markers, as well as the need to deploy stationary cameras. A more practical approach for commercial products, markerless hover sensing has been demonstrated using optical techniques, including through the use of an array of time-of-flight based range finders as well as stereo and optical cameras.

Non-optical tracking has also been demonstrated using a number of technologies. One example is the use of acoustic-based sensors, such as the "Flock of Birds" tracking employed by Fitzmaurice et al., which enables six degrees of freedom (DOF) position and orientation sensing of physical handheld objects. Although popular in research applications, widespread application of this sensor has been elusive. More common are 5-DOF tools using electro-magnetic resonance (EMR). EMR is commonly used to track the position and orientation of styli in relation to a digitizer, and employed in creating pen-based user input. Although typically limited to a small range beyond the digitizer in commercial applications, tracking with EMR has been used in much larger volumes.

Most touch sensors employed today are based on projective capacitance. Fundamentally, the technique is capable of sensing the user's presence centimeters away from the digitizer, as is done with the Theremin. Such sensors employed today are augmented with a ground plane, purposefully added to eliminate their ability to detect a user's finger prior to touch. More recently, sensors have been further augmented to include the ability to not only detect the user's finger above the device, but also to detect its distance from the digitizer.

Use of Hover

Prior work has explored the use of sensing hover to enable intentional user input. In contrast, the system and method disclosed herein, in an embodiment, effectively hides the system's ability to detect hover from the user, using it only for prediction of touch location and timing, and elimination of apparent latency.

Hover has long been the domain of pen-operated devices. Subramanian et al. suggest that the 3D position of a pointing device affects the interaction on the surface. The authors propose a multi-layer application, with an active usage of the space above the display, where users purposefully distance the pen from the display to activate actions. Grossman et al. present a technique that utilizes the hover state of pen-based systems to navigate through a hover-only command layer. Spindler et al. propose that the space above the surface be divided into stacked layers, with layer specific interactions—this is echoed by Grossman et al., who divided the space around a volumetric display into two spherical 'layers' with subtly differentiated interaction. This is distinct from Wigdor et al., who argued for the use of the hover area as a 'preview' space for touch gestures, similar to Yang et al. who used hover sensing to zoom on-screen targets. In contrast, Marquadt et al. recommend that the space above the touch surface and the touch surface be considered one continuous space, and not separate interaction spaces.

These projects focused on differentiating the space around the display, and using it as an explicit interaction volume. Our approach is more similar to that taken by Hachisu and Kajimoto, who demonstrate the use of a pair of photo-sensing layers to measure finger velocity and predict the time of contact with the touch surface. We build on this work through the addition of a model of motion that allows the prediction of not only time, but also early indication of direction, as well as later prediction of the location of the user's touch, enabling low-latency visual feedback in addition to the audio feedback they provide.

Latency

Ng et al. studied the user perception of latency for touch input. For dragging actions with a direct touch device, users were able to detect latency levels as low as 6 ms. Jota et al. studied the user performance of latency for touch input and found that dragging task performance is affected if latency levels are above 25 ms. In the present disclosure, we focus on eliminating latency of the touchdown moment when the user first touches the screen. Jota et al. found that users are unable to perceive latency of responses to tapping that occur in less than 24 ms—we use prediction of touch location to provide soft touchdown feedback within this critical time, effectively eliminating perceptible latency.

Predicting Input

Predicting users' actions has been an active area of research in the field of HCI. Mackenzie proposes the application of Fitts's Law to predict movement time for standard touch interfaces. By building a Fitts's model for a particular device, the movement time can be predicted given a known target and cursor position. Wobbrock et al. complements this approach with a model to predict pointing accuracy. Instead of predicting movement time, a given movement time is used to predict error. In many pointing experiments, the input device is manipulated by in-air gestures, including Fitts's original stylus-based apparatus. Murata proposes a method for predicting the intended target based on the current mouse cursor trajectory. The author reports movement time reductions when using the predictive algorithm, but notes limited returns for dense target regions. Baudisch et al. adopted this approach: instead of jumping the cursor close to the target, this technique wraps eligible targets around the cursor.

We sought to build on these projects by developing a model of hand motion while performing touch-input tapping tasks, and apply this model to reducing apparent latency.

Models of Hand Motion

Biomechanists and neuroscientists are actively engaged in the capture and analysis of 3D human hand motion. Their interest lies primarily in the understanding of various kinematic features, such as muscle actuation and joint torques, as well as cognitive planning during the hand movement. Flash modeled the unconstrained point-to-point arm movement by defining an objective function and running an optimization algorithm. They found that the minimization of hand jerk movements generates an acceptable trajectory. Following the same approach, Uno optimizes for another kinematic feature, torque, to generate the hand trajectory. While informative, these models are unsuitable to our goal of reducing latency, as they are computationally intensive and cannot be computed in real-time (for our purposes, as in little as 30 ms).

We disclose below, in an embodiment, a generic model focusing on the prediction of landing location and touch time based on the pre-touch movement to reduce the time between the finger landing on the screen and the system's apparent response.

Having examined this related work, we turned our attention to the development of our predictive model of hand motion when performing pointing tasks on a touchscreen display. To that end, we first performed a data collection experiment. The data from this experiment was then used to develop our model.

Data Collection

To form a predictive model of tap time and location, we began by collecting data of tap actions on a touchscreen display. Participants performed tap gestures with varying target distance and direction of gesture. The data were then used to build our model, which we subsequently validated with a study we will later describe.

Participants

We recruited 15 right-handed participants (6 female) aged 22-30 from the local community. Participants reported owning 2 (mean) touch devices and spend 2-4 hours a day using them. Participants were paid $20 for a half-hour session.

Apparatus

The study was implemented using two different sensors: to sense touch, a Microsoft Surface tablet 2.0 was used (Samsung SUR40 with PixelSense). Pre-touch data was captured using a Vicon tracking system. Participants wore a motion capture marker-instrumented ring on their index fingertip, which was tracked in 3D at 120 Hz.

The flow of the experiment was controlled by a separate PC, which received sensing information from both the Surface touch system and the Vicon tracking system, while triggering visual feedback on the Surface display. The experiment was implemented in python and shown to the user on the Surface table. It was designed to (1) present instructions and apparatus to the participant, (2) record the position and rotation of the tracked finger, (3) receive current touch events from the Surface, (4) issue commands to the display, and (5) log all of the data.

Task

Participants performed a series of target selection tasks, modeled after traditional pointing experiments, with some modifications made to ensure they knew their target before beginning the gesture, thus avoiding contamination of collected data with corrective movements. Target location was randomized, rather than performed in sequential-circle. Further, to begin each trial, participants were required to touch and hold a visible starting point (r=2.3 cm), immediately after the target location was shown. They were required to hold the starting point until an audio cue was played (randomly between 0.7 and 1.0 seconds after touch). If the participant anticipated the beginning of the trial and moved their finger early, the trial would be marked as an error.

Immediately after the participants touched the starting point, at the opposite side of the circular arrangement a target point would appear for participants to tap. The target size of 2.3 cm was selected as a trade-off between our need to specify end-position while minimizing corrective movements. Once a successful trial was completed, participants were instructed to return to another starting point for the next trial. Erroneous tasks were indicated with feedback on the Surface display and repeated.

Procedure

Participants were asked to complete a consent form and a questionnaire to collect demographic information. They then received instruction on how to interact with the apparatus and successfully completed 30 training trials. After the execution of each trial, a text block at the top right corner of the screen would update the cumulative error rate (shown as %). Participants were instructed to slow down if the error rate was above 5%, but were not given any instructions regarding their pre-touch movement.

Design

Tasks were designed according to two independent variables: target direction (8 cardinal directions) and target distance (20.8 cm and 30.1 cm). The combination of these two variables produces 16 unique gestures. There were four repetitions for each combination of direction and distance. Therefore, a session included a total of 64 actions. The ordering of the trials was randomized within each session. Participants completed 3 sessions and were given a 5-minute break between sessions.

Figure 2:
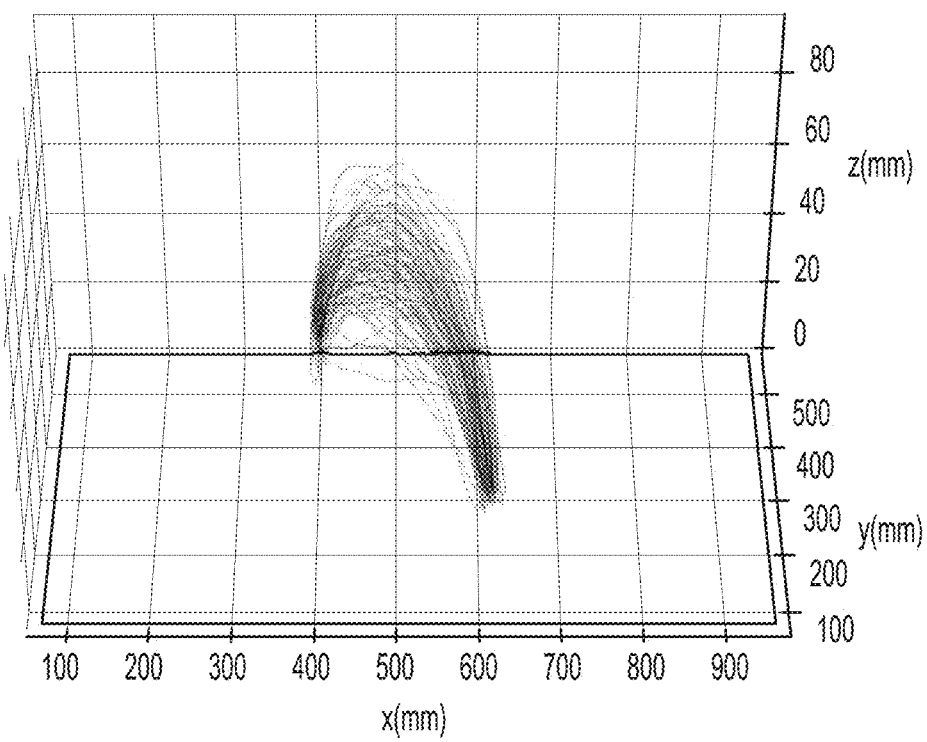
FIG. 2 shows a graph illustrating overlay of all the pre-touch approaches to a northwest target. The blue rectangle represents the interactive surface used in the study.

In summary, 15 participants performed 192 trials each, for a total of 2880 trials. FIG. 2 shows an overlay of all the pre-touch approaches to a northwest target. The rectangle represents the interactive surface used in the study.

Measures and Analysis Methodology

For each successful trial we captured the total completion time; finger position, rotation, and timestamp for every point in the finger trajectory; as well as the time participants touched the screen. Tracking data was analyzed for significant tracking errors, with less than 0.3% of the trials removed due to excessive noise in tracking data. Based on the frequency of the tracking system (120 Hz) and the speed of the gestures, any tracking event that was more than 3.5 cm away from its previous neighbor was considered an outlier and filtered (0.6%). The raw data (including outliers) for a particular target location are shown in FIG. 2.

After removing 8 trials due to tracking noise, we had 2872 trials available for the development of our predictive model.

Analysis & Predicting Touch

Having collected these tapping gestures, we turned our attention to modeling the trajectories with the primary goal of predicting the time and location of the final finger touch. Here we describe our approach, beginning with a discussion of the attributes of the touch trajectories, followed by the model we derived to describe them.

Note that our three-dimensional coordinate system is right-handed: x and y representing the Surface screen; the origin at the bottom-left corner of the Surface display; and z, the normal to the display.

Numerical and Qualitative Observations

Time & Goals: participants completed each trial with an mean movement time of 416 ms (std.: 121 ms). Our system had an average end-to-end latency of 80 ms: 70 ms from the Vicon system, 8 ms from the display, and 2 ms of processing. Thus, to drop touch-down latency below the 24 ms threshold, our goal was to remove at least ~56 ms via prediction. Applying our work to other systems will require additional tuning.

Figure 3:
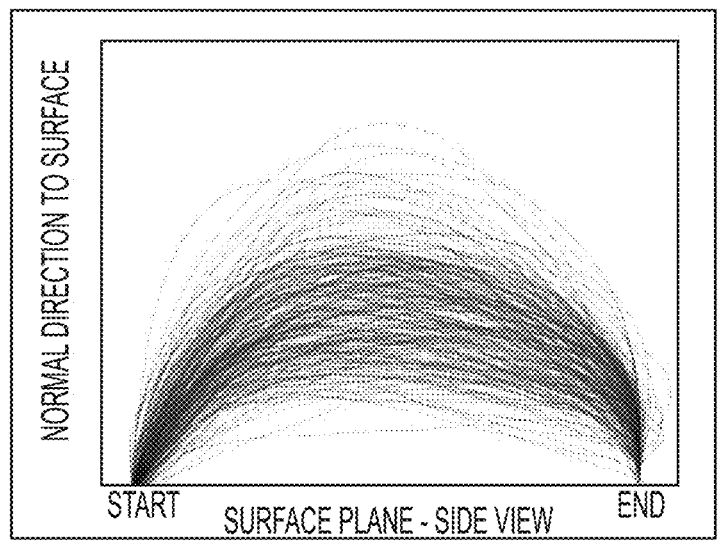
FIG. 3 shows a graph illustrating a side view overlay of all trials, normalized to start and end positions.

Movement phases: FIG. 3 shows that all the trajectories have one peak, with a constant climb before, and a constant decline after. However, we did not find the peak to be at the same place in-between trajectories. Instead the majority of trajectories are asymmetrical, 2.2% have a peak before 30% of the total path, 47.9% have a peak between 30-50% of the total path, 47.1% have a peak between 50-70% of the total path, and 2.8% have a peak after 80% of the trajectory completed path.

We have found it useful to divide the movement into three phases: lift-off, which is characterized by a positive change in height, continuation, which begins as the user's finger starts to dip vertically, and drop-down, the final plunge towards the screen. Each of the lift-off and drop-down phases has interesting characteristics, which we will examine.

Figure 4:
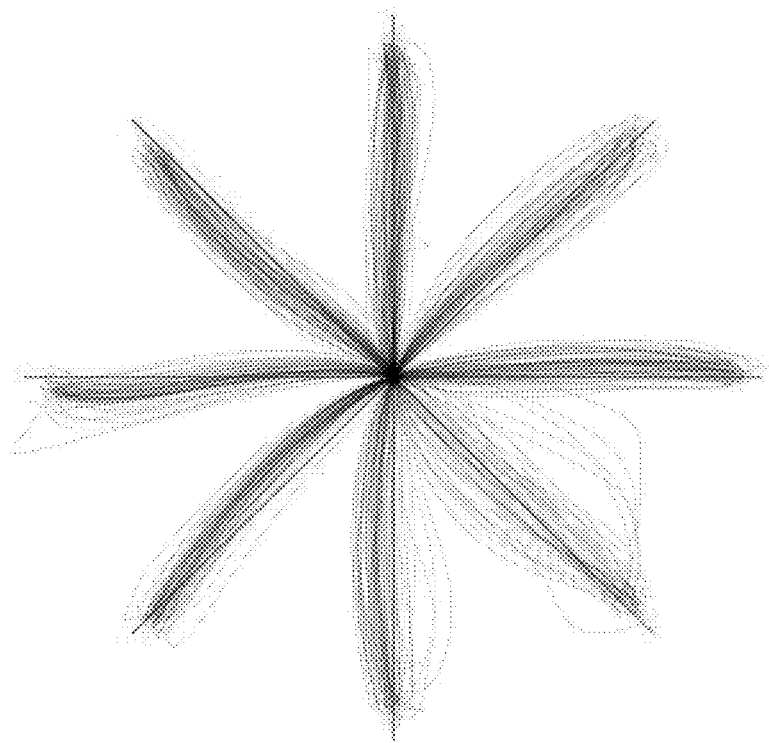
FIG. 4 shows a trajectory for the eight directions of movement, normalized to start at the same location (center).

FIG. 4 shows trajectory for the eight directions of movement, normalized to start at the same location (center). The solid lines represent the straight-line approach to each target. With respect to lift-off direction, as might be expected, the direction of movement of the user's hand above the plane of the screen is roughly co-linear to the target direction, as shown in the figure. Fitting a straight line to this movement, the angle of that line to a straight line from starting point to the target is, on average, 4.78°, with a standard deviation of 4.51°. Depending on the desired degree of certainty, this information alone is sufficient to eliminate several potential touch targets.

Figure 5:
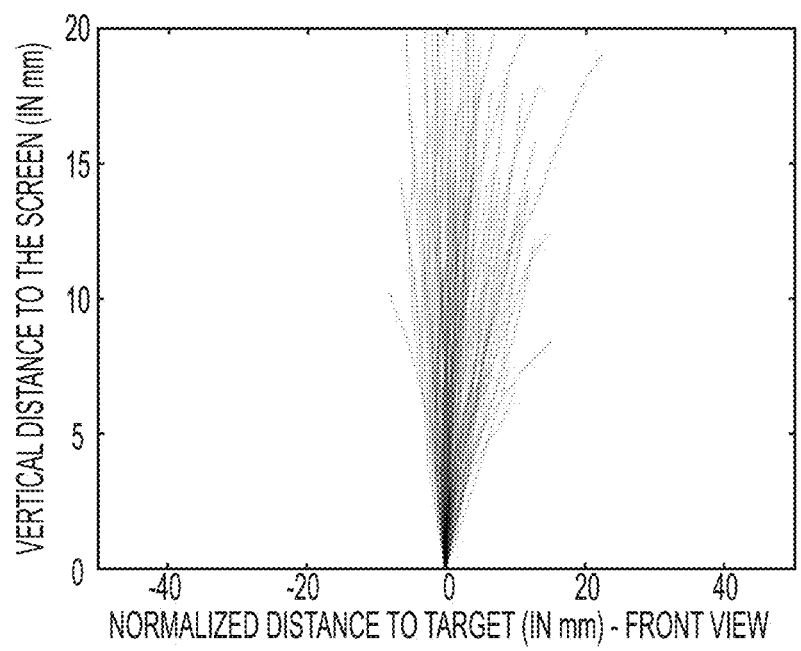
FIG. 5 shows a graph illustrating final finger approach, as seen from the approaching direction.
Figure 6:
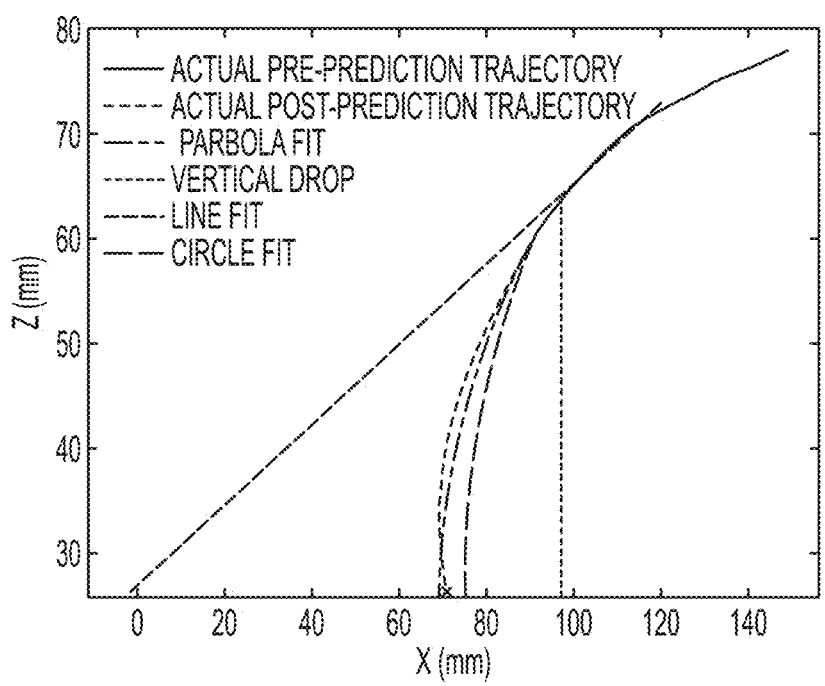
FIG. 6 shows a graph illustrating trajectory prediction for line, parabola, circle and vertical fits. Future points of the actual trajectory (dots) fit a parabola best.
Figure 7:
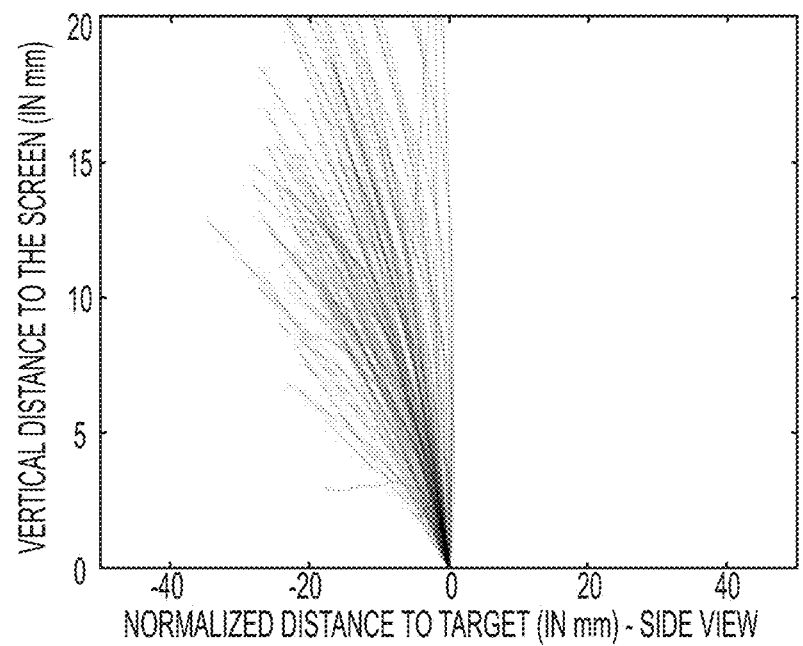
FIG. 7 shows a graph illustrating final finger approach, as seen from the side of the approaching direction.

With respect to drop-down direction, FIG. 5 and FIG. 7 show the trajectory of final approach towards the screen. As can be seen, the direction of movement in the drop-down phase roughly fits a vertical drop to the screen. We also note that, as can be seen in FIG. 7, the final approach when viewed from the side is roughly parabolic. It is clear when examining FIG. 7 that a curve, constrained to intersect on a normal to the plane, will provide a rough fit. We examined several options, shown in FIG. 6, and found that a parabola, constrained to intersect the screen at a normal, and fit to the hover path, would provide the best fit.

Predictive Touch Model

Based on these observations, we present a prediction model, which makes three different predictions at three different stages in the user's gesture. They are initial direction, final touch location, and final touch time. Making predictions at three different moments allows our model to provide progressively more accurate information, allowing the UI to react as early as possible.

Prediction 1: Direction of Movement

Lift-off begins with a user lifting a finger off the touch surface and ends at the highest point of the trajectory (peak). As we discussed, above, this often ends before the user has reached the halfway point towards their desired target. As is also described, the direction of movement along the plane of the screen can be used to coarsely predict a line along which their intended target is likely to fall. At this early stage, our model provides this line, allowing elimination of targets outside of its bounds.

Prediction 2: Final Touch Location

Figure 8:
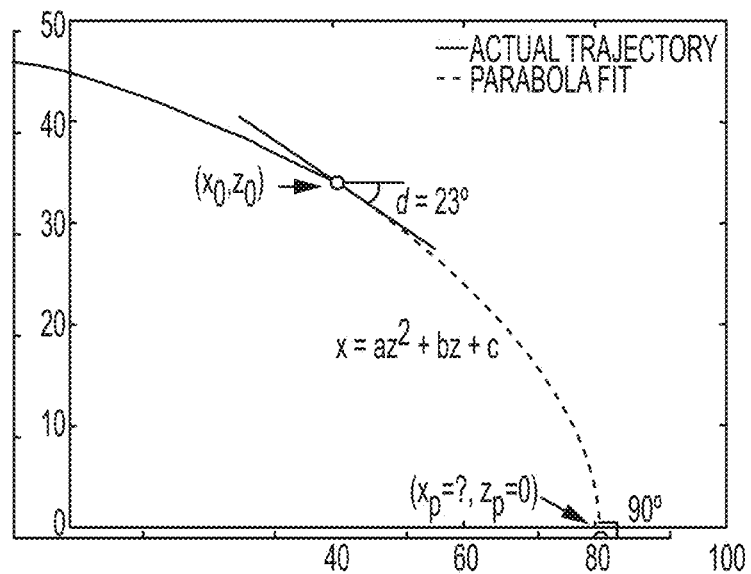
FIG. 8 shows a graph illustrating a parabola fitted in the drop-down plane with (1) an initial point, (2) the angle of movement, (3) and the intersection is orthogonal with the display.
Figure 9:
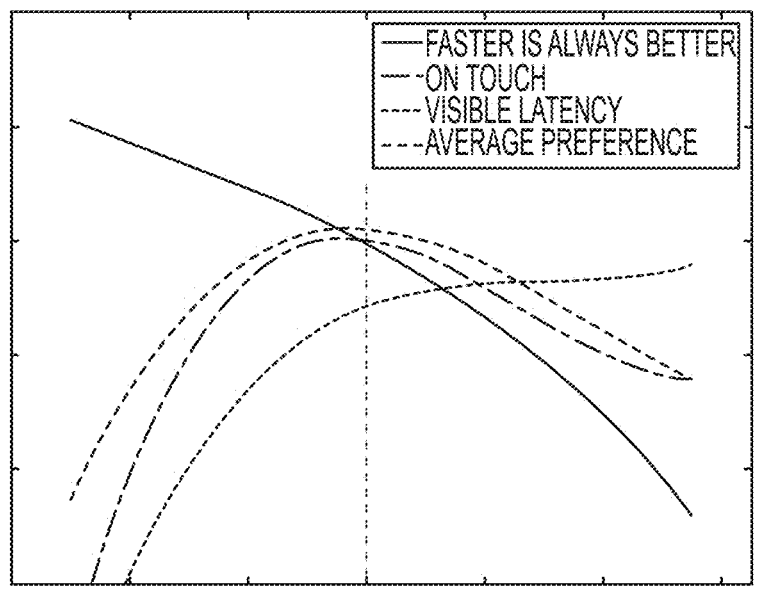
FIG. 9 shows a graph illustrating a preference curve for each observed trend and average latency preference for all participants.

A prediction of the final location of the touch, represented as an x/y point, is computed by fitting a parabola to the approach trajectory. FIG. 8 shows the parabola fitted in the drop-down plane with (1) an initial point, (2) the angle of movement, (3) and the intersection is orthogonal with the display. This parabola is constrained as follows: (1) the plane is fit to the (nearly planar) drop-down trajectory of the touch; (2) the position of the finger at the time of the fit is on the parabola; (3) the angle of movement at the time of the fit is made a tangent to the parabola; (4) the angle of intersection with the display is orthogonal. Once the parabola is fit to the data, and constrained by these parameters, its intersection with the display comprises the predicted touch point. The fit is made when the drop-down phase begins. This is characterized by two conditions: (1) the finger's proximity to the screen; and (2) the angle to xy plane is higher than a threshold.

For each new point i, when the conditions are satisfied, the tapping location is predicted. To calculate the tapping location, we first fit a vertical plane to the trajectory. Given the angle d and $(x_0, z_0)$, we predict the landing point, $(x_p, z_p)$, by fitting a parabola:

$$x = az^2 + bz + c$$

Based on the derivatives at $(x_0, z_0)$ and $(x_p, z_p)$:

$$x'_0 = \frac{-1}{\tan(d)} \quad x'_p = 0$$

we calculate a, b, and c as follows:

$$a = \frac{x'_p - x'_0}{2(z_p - z_0)}$$

$$b = x'_0 - 2az_0$$

$$c = x_0 - az_0^2 - bz_0$$

The landing point in this plane is defined as:

$$(x_p, z_p) = (c, 0)$$

Converting $(x_p, z_p)$ back to the original 3D Vicon tracking coordinate system yields the landing position.

The timing of this phase is tuned based on the overall latency of the system, including that of the hover sensor: the later the prediction is made, the more accurate it will be, but the less time will be available for the system to respond. The goal is to tune the system so that the prediction arrives at the application so that it can respond immediately, and have its response shown on the screen at the precise moment the user touches. Through iterative testing, we found that, for the latency of our system (display+Vicon, approximately 80 ms) setting thresholds of 4 cm (distance to display) and 23° (angle to plane) yielded the best results. Given these unusually high latencies values, a more typical system would see even better results.

With these thresholds, our model predicts a touchdown location with an average error (distance to actual touch point) of 1.18 cm and standard deviation of 1.09 cm, on average, 91 milliseconds (std.: 72 ms) before touchdown and at an average distance of 3.22 cm (std.: 1.30 cm) above the display. For the same set of trials, the errors for other curves: circular fit (avg.: 1.72 cm, std.: 1.62 cm), vertical drop (avg.: 2.43 cm, std.: 2.04 cm) and a linear fit (avg.: 9.3 cm, std.: 4.83 cm) are larger than the parabolic fit.

The visual results and statistics indicate that pre-touch data has the potential to predict touch location long before the user touches the display. We validate the parabolic prediction model in a secondary study by using it to predict touch location in real time.

Prediction 3: Final Touch Time

Given that the timing of the prediction of final touch location is tuned to the latency of the system on which it is running, the time that it is delivered ahead of the actual touch is reliable. The goal of this final step is to provide a highly-accurate prediction of the time the user will touch, which necessitates waiting until the final approach to the display. We observed that the final 'drop' action, beyond the final 1.8 cm of a touch gesture, experiences almost no deceleration. Thus, when the finger reaches 1.8 cm from the display, a simple linear extrapolation is applied assuming a constant velocity.

We are able to predict within 2.0 ms (mean; std.: 19.5 ms), 51 ms (mean; std.: 42 ms) before touchdown. Note that, due to the 80 ms latency of our Vicon sensor, this prediction is typically generated after the user has actually touched. We include it here for use with systems not based on computer vision and subject to network latency.

Model Evaluation

Having developed our model using the collected data, we sought to validate the model outside the condition of the first study. We recruited 15 new right-handed participants from the local community (7 female) that had not participated in the first study with ages ranging from 20 to 30. On average, our participants own two touch devices and spend two to four hours a day using them. Participants were paid $10 for a half-hour session.

From the first study we observed that arm joint movement skews the trajectory. The longer the distance, the more skewed the trajectory becomes. Secondly, people dynamically correct the trajectory. The smaller the target, the more corrections were observed. To further study these effects, we included target distance and size as independent variables. Therefore, our validation study was designed according to three different independent variables: target direction (8 cardinal directions), target distance (25.5 cm, 32.4 cm, and 39.4 cm), and target size (1.6 cm, 2.1 cm, and 2.6 cm). The combination of these three variables produces 72 unique tasks. The order of target size and distance was randomized, with target direction always starting with the south position, and going clockwise for each combination of target size and distance. Participants completed 3 sessions and were given a break after each session.

The procedure and apparatus were identical to the first study, with the exception of the prediction model running in the background in real time. The prediction model did not provide any feedback to the participants. For each trial we captured the trajectories and logged the prediction results.

Results

Prediction 1: On average, the final touch point was within 4.25° of the straight-line prediction provided by our model (std.: 4.61°). On average, this was made available 186 ms (mean; std.: 77 ms) before the user touched the display. We found no significant effect for target size, direction, or distance on prediction accuracy.

Prediction 2: On average, our model predicted a touch location with an accuracy of 1.05 cm (std.: 0.81 cm). The finger was, on average, 2.87 cm (std.: 1.37 cm) away from the display when the prediction was made. The model is able to predict, on average, 128 ms (std.: 63 ms) before touching the display, allowing us to significantly reduce latency. We found no significant effect for target size, direction, or distance on prediction accuracy.

Prediction 3: On average, our model predicted the time of the touch within 1.6 ms (std.: 20.7 ms). This prediction was made, on average, 49 ms before the touch was made (std.: 38 ms). We found no significant effect for target size, direction, or distance on prediction accuracy.

These results indicate that our prediction model can be generalized to different target distances, sizes, and directions, with an average drift from the touchdown location of 1.05 cm, 128 ms prior to the finger touching the device. To provide context, given that our mean trial completion time for the experiment was approximately 447 ms, this means that we were able to predict the location of the final touch before 29% of the approach action was completed.

Preferred Latency Level

Armed with our prediction model, we are able to provide tapping feedback with a latency range from −100 ms to 100 ms. From previous work, we know that latencies below 24 ms are unperceivable by humans, however we have no understanding if unperceivable latency UI is, indeed, preferred by users. Using our predictive model, we generated widgets with different levels of latency and evaluated what amount of latency participants prefer. We were particularly curious about participants' responses to negative latency—that is, having a UI element respond before they finish reaching for it.

Participants

We recruited 16 right-handed participants from the local community (8 male, 8 female) with ages ranging from 20 to 31. On average, our participants own two touch devices and spend three to four hours a day using them. We paid participants $10 for a half-hour session.

Task

The participants were shown a screen with two buttons, each with different response latency. Before tapping each button once, they were asked to touch and hold a visible starting point until audio feedback, which would occur randomly between 0.7 and 1.0 seconds later, was given. They then were asked to indicate which button they preferred.

Design

Tasks were designed with one independent variable, response latency. To limit combinatorial explosion, we decided to provide widget feedback under five different conditions: immediately as a finger prediction is made (0ms after prediction) and then artificially added latencies of 40, 80, 120, and 160 ms to the predicted time, resulting in 10 unique pairs of latency. To remove the possible preference for buttons placed to the left or right, we also flipped the order of the buttons, resulting in 20 total pairs. The ordering of the 20 pairs was randomized within each session. Latency level was also randomly generated. Participants completed 7 sessions of 20 pairs and were given a 1-minute break between sessions, for a total of 2240 total trials.

Methodology

To calculate the effective latency we first calculate the response time and the touch time. The response time is calculated by artificially adding to the time of prediction some latency (between 0 and 160 ms). For touch time, we consider when the Surface detected the touch and subtract a known Surface latency of 137 ms. The effective latency is the difference between the response time and the touch time.

Results

After pressing both buttons in one trial, participants indicated which button they preferred. Each trial resulted in 2 points (not shown); one at (L1, 1) for the preferred latency L1, and one at (L2, 0) for the other latency L2. For each participant, a curve is fit to 280 data points. Three possible curves emerged, increasing, decreasing, and peaked. During debriefing, we questioned participants regarding how they select the preferred latency, and identified three strategies (Faster is Always Better, On Touch, Visible Latency), aligned with the curve of each participant. Three corresponding curves were generated from the participants in each of these three groups. The dotted line is a curve fit to all data points, indicating that overall participants preferred latencies around 40 ms.

Faster is Always Better. Four participants that preferred negative latency were aware that the system was providing feedback before the actual touch, but are confident that the prediction is always accurate and therefore, the system should respond as soon as a prediction is possible.

On Touch. Eight participants preferred a system where effective latency is between 0 ms and 40 ms. Participants commented that they liked that the system reacted exactly when their finger touched, but not before. When asked why they did not prefer negative latency, participants mentioned loss of control and lack of trust regarding the predictive accuracy of the system as reasons for this preference.

Visible Latency. Four participants preferred visible latency. When asked about the feeling of immediate response, they expressed that they were not yet confident regarding the predictive model and felt that an immediate response wasn't indicative of a successful recognition. Visible latency gave them a feeling of being in control of the system and, therefore, they preferred it to immediate response. This was true even for trials where prediction was employed.

Our results show that there is a strong preference for latencies that are only achievable through the use of prediction. Overall, our participants indicated that they preferred the lower-latency button in 62% of the study's trials. We ran a Wilcoxon Signed-Rank test comparing the percent of trials where the lower latency was preferred to the percent of trials where the higher latency was preferred, and found a significant difference between the two percentages (Z=2.78 p=0.003). 12 out of 16 participants preferred effective latencies below 40 ms, which was concluded to be unperceivable for 85% of the participants.

New Opportunities and Considerations

In this section, we detail a number of new interaction opportunities that our prediction model provides and discuss some of the considerations that system designers must address when employing these techniques.

Reducing Apparent Latency

Our motivating use case is the reduction of visual latency in order to provide the user with a more reactive touch-input experience. Based on our validation study, our model can predict touch location accurately enough at a sufficient time horizon to support simultaneous touch and visual response. A prediction 128 ms prior to the finger touching the device is sufficient to pre-buffer and display the visual response to the input action. We believe that this work validates the assertion that computer systems can be made to provide immediate, real-world-like responses to touch input.

Beyond accelerating traditional visual feedback, our approach enables a new model of feedback based on predicted and actual input. With the prediction data from this model, soft feedback can be designed to provide an immediate response to tapping, eliminating the perception of latency. After the touch sensor captures the touch event, a transition from the previous soft feedback to the next user interface (UI) state can be designed to provide a responsive and fluent experience, instead of showing the corresponding UI state directly.

Reducing Programmatic Latency

Beyond changes to the visual appearance of GUI elements, touch-controlled applications execute arbitrary application logic in response to input. A 128-200 ms prediction horizon provides system designers with the intriguing possibility of kicking-off time consuming programmatic responses to input before the input occurs.

As an example, consider the widely adopted practice of pre-caching web content based on the hyperlinks present in the page being currently viewed. Pre-caching has been shown to significantly reduce page-loading times. However, it comes at the expense of increasing both bandwidth usage and the loads on the web servers themselves, as content is often cached but not always consumed. Additionally, with the potential for many referenced URLs on any one page, it is not always clear to algorithm designers which links to pre-fetch, meaning that clicked-on links may not have already been cached.

A web-browser coupled with our input prediction model would gain a 128-200 ms head-start on loading linked pages. Recent analysis has suggested that the median web-page loading time for desktop systems is 2.45 s. As such, a head-start could represent a 5-8% improvement in page loading time, without increasing bandwidth usage or server burden. Similar examples include the loading of launched applications and the caching of the contents of a directory.

Figure 10:
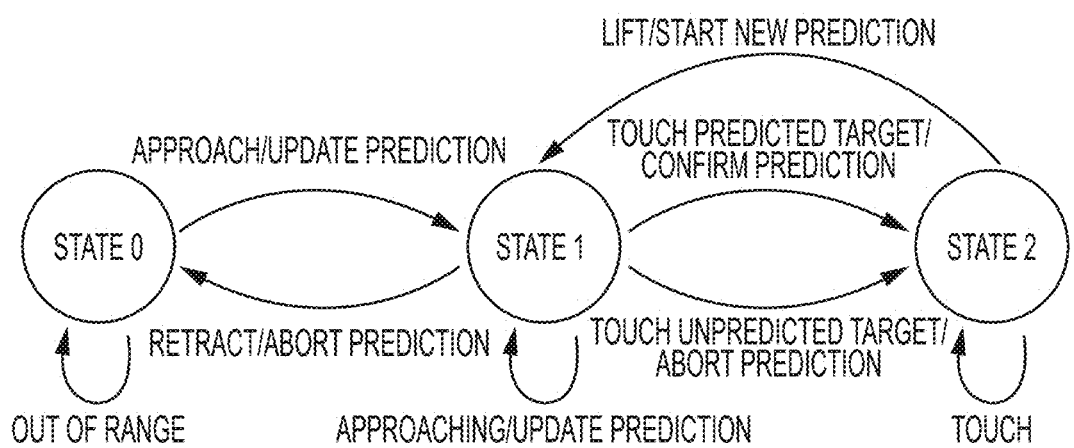
FIG. 10 shows a state diagraph illustrating transitions between three states of touch input that model the starting and stopping of actions, based on prediction input.

To fully take advantage of predicted input, we propose a modification to the traditional three-state model of graphical input, proposed by Buxton, that allows for programmatic responses to be started and aborted as appropriate as the input system updates its understanding of the user's intent. FIG. 10 shows this model: in State 1, related actions can be issued by the input system as predictions (direction, location, and time) of a possible action are received. When no actual input is being performed (e.g. the user retracts hand), the input system will stop all actions. When the actual touch target turns out not to be the predicted one, the system may also stop all actions but this will not add extra latency compared to the traditional three-state model. On the other hand, if the touch sensor confirms the predicted action, the latency of the touch sensor, network, rendering, and all the procedure related parts will be reduced.

Recognizing Unintended Input

Another possible application of our prediction model is the reduction of accidental input by masking unintended areas. Based on our data analysis, the lift-off itself affords a coarse prediction of target direction, as the majority of touches we recorded were roughly planar. In addition, as the prediction target is updated, the potential area for touchdown will shrink. Therefore, the input system can label the touch events in the areas where touchdown is not likely as accidental events and ignore them.

Discussion

Our results indicate that solving the problem of latency has clear implications about how users perceive system performance. If the predicted touchdown point is not accurate users can detect the difference, not always favorably, especially when presented with negative latency. On the other hand, it seems that if we are capable of eliminating perceived latency, with time, users will adapt and expect an immediate response out of their interactive systems.

Our prediction model is not constrained to only solving latency. The approach is rich in motion data and can be used to enrich many UIs. For example, the velocity of a finger can be mapped to pressure, or the approach direction can be mapped to different gestures. Equally important, perhaps, is the possibility to predict when a finger is leaving a display but not landing again inside the interaction surface, effectively indicating that the user is stopping interaction. This can be useful, for example, to remove UI elements from a video application when the user is leaving the interaction region.

The model relies on a high fidelity 3D tracking system, currently unavailable for most commercial products. Here we provide a detailed discussion about how to enable it in everyday life. We used a Vicon tracking system, running at 120 Hz, to capture the pre-touch data. As this high frequency tracking is not realistic for most commercial products, we tested the model at 60 Hz, slower than most commercial sensors. Although prediction is delayed 8 ms on average, the later fit has the benefit of increasing prediction accuracy, because the finger is closer to the display.

Some commercial products already include accurate hover sensing technique, such as Wacom Intuos with EMR-based sensor and Leap Motion with vision-based sensor; both are able to run at 200 Hz, with sub-millimeter accuracy. Moreover, the model predicts tapping location when the finger is 2.87 cm and 3.22 cm away from the screen in our studies; these results are within capabilities of EMR and vision. Additionally, a number of plausible technologies for achieving hover sensing appeared recently in HCI research. HACHIStack has a sensing height of 1.05 cm above a screen with 31 μs latency. Retrodepth can track hand motion in a large 3D physical input space of 30×30×30 cm. Therefore, we believe an accurate, low-latency hover sensing is on its way soon. We also envision that, when faster touch sensor and CPU finally bring the nearly zero tapping latency, this model will remain useful for achieving negative latency, impossible even for a zero-latency touch sensor.

In this paper, we built a prediction model and evaluate long ballistic pointing tasks. However, in realistic tasks, the finger motion will be much more complex, with pauses, hesitation, and short tracking distances. To make the model robust to these changes, we propose the fine-tuning of two variables that determine when the system starts predicting: the vertical distance, tuned at 4 cm (in Z) to avoid direction changes normal to touch approaches, and approach angle tuned at 23° (for our system) to confirm that the finger entered a drop down phase. With this tuning, the model predicts location and time in the last 29% of the entire trajectory. Other kinematic features, such as the approaching velocity and direction can also be integrated into the model to make it more robust. Still, there is no doubt that the model would benefit from evaluation with real tasks, and we encourage the effort to make the model work perfectly in the real world.

CONCLUSION

We present a prediction model for direction, location, and contact time of a tapping action on touch devices. In an embodiment, with this model, the feedback is shown to the user at the moment they touch the display, eliminating the touchdown latency. Results from the user study reveal a strong preference for unperceived latency feedback. Also, predicting the touch input long before the actual touch brings the opportunity to reduce not only the visual latency but also latency of various parts of a system that are involved in the response to the predicted touch input.

Throughout this disclosure, the terms "touch", "touches," "contact," "contacts" or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" or "contacts" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. As used herein, the phrase "touch event" and the word "touch" when used as a noun include a near touch and a near touch event, or any other gesture that can be identified using a sensor.

While the invention has been particularly shown and described with reference to a preferred embodiment thereof, it will be understood by those skilled in the art that various changes in form and details may be made therein without departing from the spirit and scope of the invention.

What is claimed is:

1. A method for using a touch sensing system capable of sensing location of a finger or object above a touch surface in an electronic device to inform a touch response system in the electronic device of a touch event in advance of an actual touch event, the method comprising:

storing a model of user interaction with a touch surface, wherein the model relies at least in part on trajectory;

sensing at least one current user input via the touch sensing system;

creating in the electronic device data representative of the sensed at least one current user input, the data reflecting hover information;

applying the model of user interaction to the data representative of current user input to create data reflecting a prediction of a future touch event;

providing to a touch response system an indication of the future touch event prior to occurrence of the actual touch event; and wherein the providing step is performed prior to a time t−(L−i), where t is a predicted time that the future user input event will occur, L is an estimate of actual latency in the device, and i is a time required for perceived zero latency.

2. The method for using current user input according to claim 1, further comprising:

prior to occurrence of the predicted user input event, providing to the touch response system a parameter of a finger or object's motion.

3. The method for using current user input according to claim 2, wherein the parameter is speed.

4. The method for using current user input according to claim 2, wherein the parameter is acceleration.

5. The method for using current user input according to claim 2, wherein the parameter is a vector.

6. The method for using current user input according to claim 1, further comprising:
prior to occurrence of the predicted user input event, providing to the touch response system an approach direction of a finger or object.

7. The method for using current user input according to claim 1, wherein the hover information comprises information derived from tracking a finger or object as it approaches the touch surface.

8. The method for using current user input according to claim 1, wherein the providing step is performed at a time that provides the touch response system with a predetermined prediction horizon prior to occurrence of the predicted user input event.

9. A method for using a touch sensing system capable of sensing location of a finger or object above a touch surface in an electronic device to inform a touch response system in the electronic device of a touch event in advance of an actual touch event, the method comprising:
storing a model of user interaction with a touch surface, wherein the model relies at least in part on trajectory;
sensing at least one current user input via the touch sensing system;
creating in the electronic device data representative of the sensed at least one current user input, the data reflecting hover information;
applying the model of user interaction to the data representative of current user input to create data reflecting a prediction of a future touch event;
providing to a touch response system an indication of the future touch event prior to occurrence of the actual touch event; and
wherein the model comprises a model of a liftoff phase.

10. The method for using current user input according to claim 1, wherein the model comprises a model of a correction phase.

11. The method for using current user input according to claim 1, wherein the model comprises a model of a drop-down phase.

12. The method for using current user input according to claim 1, wherein the providing step comprises providing, prior to occurrence of the actual user input event, a confidence level associated with the predicted future touch event.

13. The method for using current user input according to claim 1, wherein the providing step further comprises providing, prior to occurrence of the actual user input event, data indicating that the predicted future user input event is an unintended input.

14. The method for using current user input according to claim 1, wherein the providing step further comprises providing data indicating that prediction of the future user input event is canceled.

15. The method for using current user input according to claim 1, wherein the data representative of current user input comprises an approach trajectory of a finger or object.

16. The method for using current user input according to claim 1, wherein the step of applying the model of user input to the data representative of current user input comprises fitting a shape to an approach trajectory of a finger or object.

17. The method for using current user input according to claim 16, wherein the shape comprises a shape selected from the set consisting of: a parabola, a line, or a circle.

18. The method for using current user input according to claim 16, wherein the step of fitting the shape to the approach trajectory comprises fitting a plane to a drop-down trajectory.

19. The method for using current user input according to claim 16, wherein the step of fitting the shape to the approach trajectory comprises constraining a parabola such that a position of the finger or object at the time of the fit is on the parabola.

20. The method for using current user input according to claim 16, wherein the step of fitting the shape to the approach trajectory comprises constraining a parabola such that an angle of movement at the time of the fit is made a tangent to the parabola.

21. The method for using current user input according to claim 16, wherein the step of fitting the shape to the approach trajectory comprises constraining the shape such that an angle of intersection with a display of the electronic device is orthogonal.

22. A method for using a touch sensing system capable of sensing location of a finger or object above a touch surface in an electronic device to inform a touch response system in the electronic device of a touch event in advance of an actual touch event, the method comprising:
storing a model of user interaction with a touch surface, wherein the model relies at least in part on trajectory;
sensing at least one current user input via the touch sensing system;
creating in the electronic device data representative of the sensed at least one current user input, the data reflecting hover information;
applying the model of user interaction to the data representative of current user input to create data reflecting a prediction of a future touch event;
providing to a touch response system an indication of the future touch event prior to occurrence of the actual touch event; and
wherein the step of applying the model of user input to the data representative of current user input comprises fitting a parabola to an approach trajectory of a finger or object and predicting a touch point by determining an intersection of the fitted parabola with a display of the electronic device.

23. The method for using current user input according to claim 1, wherein the predicted future user input event is a contact with the touch surface.

24. The method for using current user input according to claim 1, wherein the predicted future user input event is a hover in proximity to the touch surface.

25. A method for using a touch sensing system capable of sensing location of a finger or object above a touch surface in an electronic device to inform a touch response system in the electronic device of a touch event in advance of an actual touch event, the method comprising:
storing a model of user interaction with a touch surface, wherein the model relies at least in part on system latency;
sensing at least one current user input via the touch sensing system;
creating in the electronic device data representative of the sensed at least one current user input, the data reflecting hover information;

applying the model of user interaction to the data representative of current user input to create data reflecting a prediction of a future touch event; and, providing to a touch response system an indication of the future touch event prior to occurrence of the actual touch event.

26. A method for using a touch sensing system capable of sensing location of a finger or object above a touch surface in an electronic device to inform a touch response system in the electronic device of a touch event in advance of an actual touch event, the method comprising:

storing a model of user interaction with a touch surface, wherein the model relies at least in part on trajectory, velocity, movement and system latency;

sensing at least one current user input via the touch sensing system;

creating in the electronic device data representative of the sensed at least one current user input, the data reflecting hover information;

applying the model of user interaction to the data representative of current user input to create data reflecting a prediction of a future touch event; and, providing to a touch response system an indication of the future touch event prior to occurrence of the actual touch event.

* * * * *